Jan. 12, 1926.

J. W. SMITH 1,569,242

SCORING DEVICE

Filed Oct. 29, 1924

INVENTOR
Julius W. Smith
BY
Frank Warren
ATTORNEY

Patented Jan. 12, 1926.

1,569,242

UNITED STATES PATENT OFFICE.

JULIUS W. SMITH, OF SEATTLE, WASHINGTON.

SCORING DEVICE.

Application filed October 29, 1924. Serial No. 746,707.

*To all whom it may concern:*

Be it known that I, JULIUS W. SMITH, a citizen of the United States, residing at Seattle, in the county of King and State of Washington, have invented a certain new and useful Improvement in Scoring Devices, of which the following is a specification.

My invention relates to improvements in the means and method of scoring the top surface of a plastic substance in a container, as cold cream in a jar, to impart to said surface a distinct and attractive appearance and leave the same in such a condition that it will be certain to show distinctly if any of the contents has been removed from the container or if the scored surface of the same has even been touched with the fingers.

A further object is to provide power operated means for rapidly scoring the top surface of jars of plastic material with alternate concentric grooves and ridges.

A further object is to provide means for scoring the top surface of a jar of plastic material while the same is in an inverted position thereby disposing by gravity of all excess material that is scraped loose from the top of said plastic material and preventing the deposit of excess plastic material on the top of the scored material in the container.

I accomplish these objects by devices illustrated in the accompanying drawings, wherein—

Figure 1:
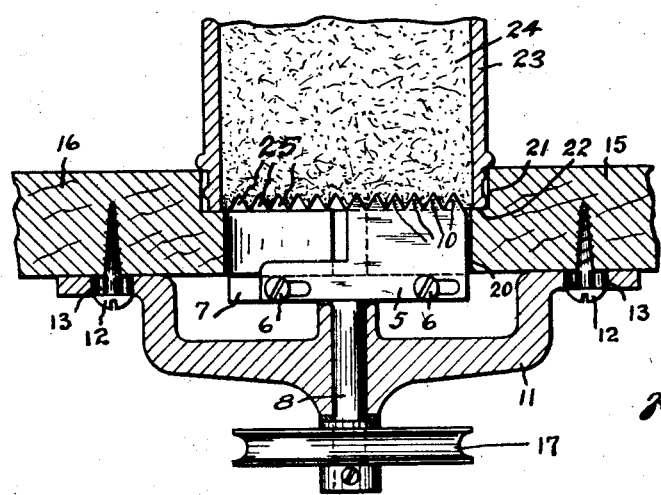
Figure 1 is a longitudinal sectional view of a scoring device constructed in accordance with my invention as the same may appear in operation, parts being shown in elevation.
Figure 2:
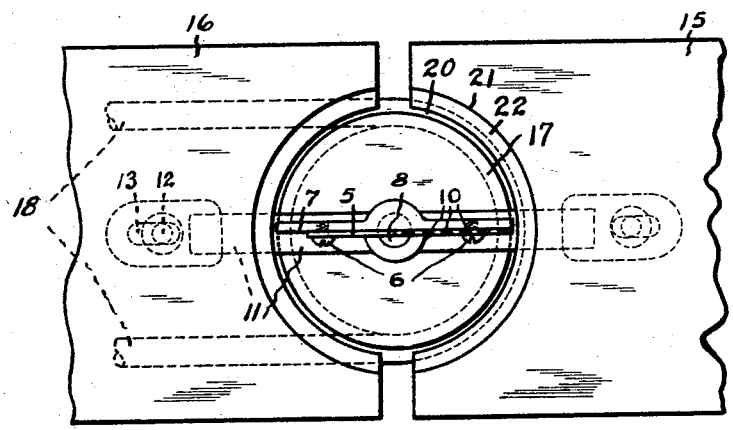
Fig. 2 is a plan view of the same with the container of plastic material removed.
Figure 3:
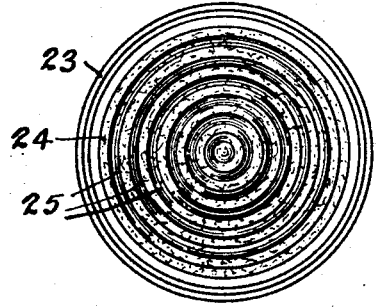
Fig. 3 is a plan view looking down into a container in which the plastic material therein is scored in accordance with my invention.

Referring to the drawings throughout which like reference numerals indicate like parts, 5 designates a blade member adjustably secured by screws 6 to a cross bar 7 on the upper end of a shaft 8. The blade member 5 is provided at one side of the central axis of the shaft 8 with an upwardly protruding portion that terminates in the teeth 10 herein shown to be of substantially V-shape like the teeth of a saw. If desired the shape of the teeth may be varied.

The shaft 8 is rotatably supported in a bracket 11 that is secured by screws 12 that pass through slots 13 to a support, preferably formed of two relatively adjustable members 15 and 16. A pulley 17 is secured on the lower end of the shaft 8 for the reception of a belt 18 by which the shaft 8 may be driven and the blade member rotated.

Supports 15 and 16 are jointly provided with a substantially cylindrical opening 20 wherein the blade 5 is operatively disposed and having on the top side of said supports a counter-bored portion 21 affording a shoulder 22 whereon the top edge of a cylindrical container 23, as a cold cream jar, may rest. The teeth 10 of the blade 5 extend above the plane of the shoulder 22 so that when a container 23 filled with plastic material as designated by the numeral 24 is inverted and the end thereof inserted in the counterbore 21 the teeth 10 will project into said plastic material and in response to relative rotation of the blade will plow or cut the grooves 25 in said plastic material. In the device disclosed, when the blade 5 is rotated about the axis of the shaft 8 which is substantially the axis of the container 23 the grooves cut thereby will be substantially concentric and will have concentric ridges formed therebetween. The same result may be attained by holding the blade 10 against rotation and turning or rotating the container.

The device does not necessarily have to be arranged with the support horizontal and the shaft vertical although it is preferred to so place these parts in order that excess plastic material scraped from the plastic material by means of the teeth 10 in forming the grooves will be disposed of by gravity and will not remain in the container to mar the scoring on the top of the plastic material.

The successive annular concentric grooves and ridges on the top of a jar of plastic material impart to the same a very neat and pleasing appearance and further serve to show the marks of fingers and the like that may have been inserted in the material or wiped over the same thus giving the prospective customer a way of determining whether or not he is buying an absolutely fresh jar of material that has not been tampered with and that has not come in contact with anything that might contaminate it.

Obviously other forms of apparatus may be used in thus scoring the material in the top of a receptacle, as for instance, an instrument may be used by hand for making one ring at a time.

What I claim is:

1. The method of scoring the surface of a plastic material disposed in a circular container which consists in presenting said surface of plastic material to a revolving blade having projecting teeth thereon.

2. The method of scoring the surface of a plastic material disposed in a circular container which consists in inverting said container and then presenting said surface of plastic material to a revolving blade having projecting teeth thereon.

3. In a scoring device the combination with a support having a cylindrical opening, of a blade arranged in said support and having teeth projecting toward said opening.

4. In a scoring device embodying a blade having a plurality of spaced points thereon arranged to extend within the top of a container that is filled with plastic material and form alternate grooves and ridges in said material in response to relative rotary movement of said blade and said container.

5. In a scoring device the combination with a container filled with plastic material, of a blade having teeth thereon arranged to project into the top surface of said plastic material and form scores in the same in response to relative rotation of said blade and said container.

6. A scoring device embodying a support having a cylindrical opening therein, a bracket secured to said support, a shaft journaled in said bracket centrally of said opening, a bar on the upper end of said shaft, a blade carried by said bar in a plane perpendicular thereto, alternate V-shaped teeth and recesses on said blade at one side of the axis of said bar, and means for rotating said bar.

7. A device for forming successive grooves and ridges in the top surface of plastic material in a container embodying a normally horizontal support having a cylindrical opening for the reception of the top end of the container, a blade arranged in a vertical plane and having teeth projecting into said opening at one side of the center and arranged to enter the surface of the plastic material in said container, and means supporting said blade for rotation about the axis of said cylindrical opening.

8. A device for forming successive concentric grooves and ridges in the surface of plastic material in a container, embodying a blade having a plurality of teeth arranged to enter the plastic material at the top of the container, and means supporting said blade for rotary movement substantially on the axis of said container.

In witness whereof, I hereunto subscribe my name this 20th day of October, A. D. 1924.

JULIUS W. SMITH.